Sept. 23, 1941.  R. K. HOPKINS  2,256,924

WELDING METHOD

Filed March 25, 1938

INVENTOR
ROBERT K. HOPKINS
BY
Virgil F. Davis
ATTORNEY

UNITED STATES PATENT OFFICE 2,256,924

WELDING METHOD

Robert K. Hopkins, New York, N. Y., assignor to M. W. Kellogg Co., New York, N. Y., a corporation of Delaware Application March 25, 1938, Serial No. 197,993

3 Claims. (Cl. 219—10)

This invention relates to welding and in particular to the welding of metal bodies that include zones of different characteristics.

In application Serial No. 193,411 filed March 2, 1938, of which this application is a continuation in part, are disclosed novel armor metal, methods of manufacturing the novel armor metal as well as methods for fabricating the novel armor metal into desired articles by welding. This application is directed to the welding of the armor metal.

It is an object of this invention to provide a method for welding armor metal which may be used satisfactorily when the hard face and the backing metal are weldable as well as when only the backing metal is weldable.

It is also an object of this invention to provide a method for welding armor metal which will produce satisfactory joints without appreciable softening of the hard face of the armor metal.

Figure 1:
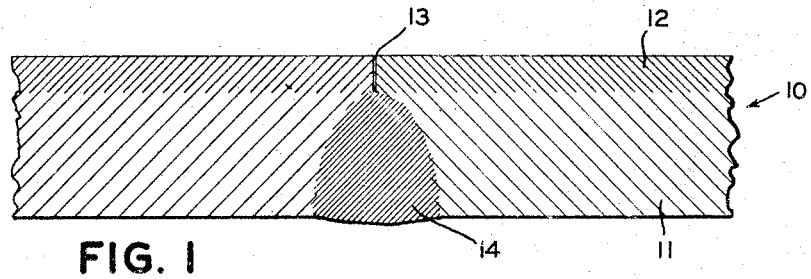
Figure 2:
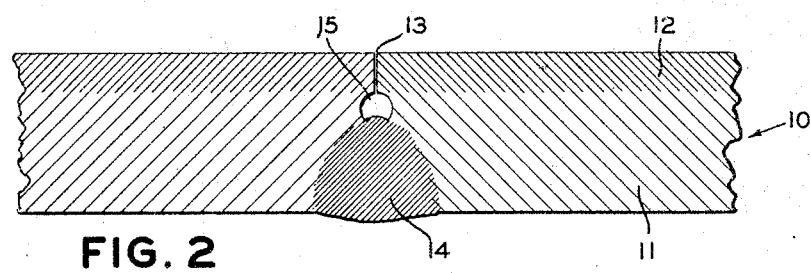

The further objects and advantages of the invention will be apparent from a consideration of the following description of preferred modes of carrying the invention out in practice, taken with the accompanying drawing in which, Fig. 1 is a fragmentary view of a welded armored article showing a welded joint in section, and Figs. 2 to 5, inclusive, are views similar to that of Fig. 1 showing other modes of making the welded joint.

In application Serial No. 193,411 is disclosed novel armor metal that is characterized by a zone of backing metal that is weldable and a zone of harder metal, defining the hard face, that may be weldable but is not necessarily weldable.

The backing zone may be of carbon steel, but it will generally be of alloy steel. A number of steels, both plain carbon and alloy are suitable. The metal chosen should, however, exhibit the following properties and characteristics:

1. It must be weldable. 2. After final heat treatment it must have the strength and toughness necessary for the intended service and must exhibit a fine grain structure. 3. After final heat treatment it must exhibit a hardness such that it will prevent dishing of the armor metal upon heavy impacts and will not throw slivers when penetrated. Depending on the ratio of hard zone thickness to the total thickness of the armor metal, the hardness of the backing zone may range from 200 to 400 Brinell. 4. It must not suffer from appreciable grain growth as a result of the heat treatment employed for developing the desired properties in the hard zone.

A number of steels of specific analysis are set forth that have the above listed properties and characteristics. Of these steels 1.25% chromium, 0.5% molybdenum, 0.25% carbon steel may be considered typical for the purpose of this disclosure.

The metal of the hard zone may also be chosen from a considerable group of steels, the most satisfactory will be found in the class of pronounced air hardening steels that can be hardened to from 400 to 650 Brinell after heating to a hardening temperature and cooling in air or oil, preferably air. The requirements for the metal of the hard zone are:

1. That it must be capable of developing the required hardness, 400 to 650 Brinell, when air or oil cooled, preferably air cooled, from the necessary hardening temperature. 2. That, after hardening treatment it will not lose a detrimental amount of hardness or toughness when heated to temperatures suitable for stress relieving welds, these temperatures will usually range in the neighborhood of 1000° F. 3. That it be preferably, though not necessarily, weldable. 4. That it be of a sufficiently sluggish nature to undergo changes, due to application of heat, slowly so as not to be susceptible to material softening when heated for comparatively short periods to elevated temperatures, temperatures above 1000° F. 5. That it be of extremely fine grain in the final hardened condition. 6. That it be workable before the hardening heat treatment.

Of the number of specific analyses of alloy steels set forth 7.5% chromium, 0.5% molybdenum, 0.70% carbon steel may be considered typical for the purposes of this specification.

The armor metal may be produced by impregnation processes, such as the well known cementation process, or by a fusion process wherein the metal of one zone is deposited in the fusing condition, under a protective blanket of flux, by means of electric current discharge on the metal of the other zone. The first method is applicable when the two zones differ in analyses only as to the hardening material whereas the second method is of general application. The metal may be formed in its ultimate thickness but it is preferably formed to a thickness greater than ultimate so that its component metals may be improved and refined by the working operations used to reduce the thickness to the ultimate.

After the metal producing operation the metal, if of the ultimate thickness, is annealed and converted into the final article or its component parts by means of the necessary forming and machining operations. At this time all necessary welding grooves are provided. This metal is then ready for the hardening treatment. If the metal is of greater than ultimate thickness it is hot worked, usually after annealing, to the desired thickness. After the working operation the metal is annealed preparatory to the forming and machining operations.

The shaped and formed article, or its component parts, is then hardened. The hardening treatment includes a uniform heating to the proper temperature for the hardness desired, 1800° F. being satisfactory for the hardness range and hard zone metal analysis given, and cooling in oil or air, but preferably air. The hardening treatment is usually followed by a tempering treatment which may include reheating to a temperature usually in the neighborhood of 1000° F., but in some cases as high as 1200° F. The article, or its component parts is then ready for welding.

The hardened article 10 or its component parts, will at this time include a zone 11 of weldable backing metal of a hardness ranging from 200 to 400 Brinell that is in a condition, as a result of its mode of manufacture, to best serve the purpose of its intended service. Article 10, or its component parts, also includes a zone 12 of hard face metal, which is preferably weldable but not necessarily so, that includes metal of hardness ranging from 400 to 650 Brinell. The metal zone 12 is likewise in the condition to best serve the purpose of its intended use. In order to successfully weld article 10, or its component parts, it is obvious that the welding must be carried out in a manner such that the characteristics and properties of the metal of zones 11 and 12 is changed to the minimum degree. This is especially true of the hardness of the metal of zone 12.

This desired result can be accomplished by performing all of the welding in backing zone 11 in such a way that a minimum of the metal adjacent the weld is raised to temperature sufficient to cause material softening, and the softening temperatures obtain for a minimum interval of time.

For this result the grooves are formed, as by machining, chipping, pressing, etc., just prior to the hardening treatment as above pointed out, entirely in the metal of zone 12. The grooves may be V-shaped, U-shaped or of any other preferred shape. The bottom of the groove while preferably in the metal of zone 12 may be brought to substantially the junction of zones 11 and 12.

To prepare for the welding, the edges to be joined are placed in abutment as in the usual practice but care should be taken to keep the width of gap 13 down to a minimum. The welding is effected by depositing weld metal 14, in the fusing condition, in the groove by means of the electric arc.

In order to keep the softening effect of the welding heat, on the metal of zones 11 and 12, down to a minimum small electrodes are employed and these progressed through the groove at the highest rates commensurate with proper penetration and dense and homogeneous deposit of metal. The desired results have been obtained by using weld rods of $\frac{1}{8}$", $\frac{3}{32}$" and $\frac{3}{16}$" diameter at rates of travel as high as 24 inches per minute. With this mode of operation a small quantity of metal is deposited at any one time at any particular point in the welding groove. Thus, the amount of heat generated at any time at any particular point in the welding groove is small, and since the heat absorbing property of the metal forming the groove is high the generated heat is quickly absorbed. Because of this, temperatures high enough to effect substantial softening do not penetrate very deep into the metal of the groove, and furthermore, do not maintain for a time interval sufficient to cause material softening. In practice, a softened band is produced adjacent weld metal 14 but the band is very narrow, in the order of a few thousandths of an inch in width. There is little, if any, measurable softening of the metal of zone 12 at any substantial distance from zone 11.

This mode of operation results in comparatively small thin beads so that many traverses are usually necessary to fill the welding groove. This is not a disadvantage when the result obtained is compared with the results of the prior art.

The completed weld described is shown in Fig. 1. This form of welded joint is stronger and otherwise more satisfactory than the present riveted joint, and since gap 13 is of narrow width the joint has close to a 100% armor value. It has been contended that the weld of Fig. 1 is not suitable for all purposes as gap 13 provides a notch at which a crack can start when the armored article is subjected to a heavy impact that tends to bend the armor metal at the weld. Without admitting the soundness of this objection, this objection is effectively overcome by resorting to the forms of welds shown in Figs. 2 to 5 inclusive.

In each of these forms there is provided a void between the bottom of the welding groove and the junction of zones 11 and 12. The void may be of substantially circular cross section, as void 15 of Fig. 2, or it may have any other preferred cross section, as substantially rectangular void 18 of Fig. 4. The voids effectively decentralize the concentration of stresses and by presenting a substantial area do not offer the opportunity for the commencement of a crack. The voids since they separate zone 12 from the area in which the welding is performed, serve as an aid in the prevention of the softening of the metal of zone 12 by the welding heat.

Figure 3:
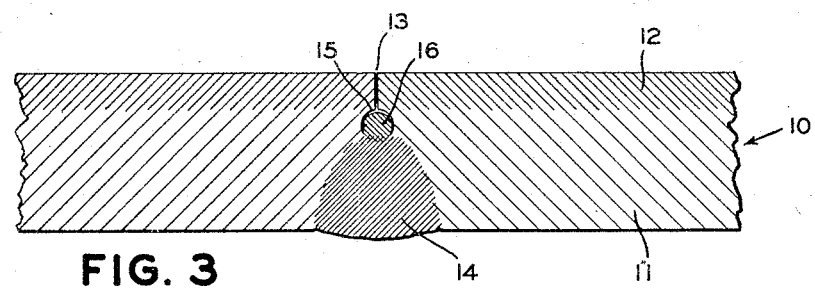
Figure 4:
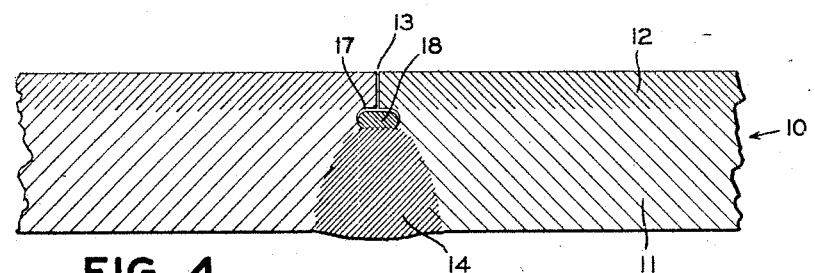

These voids may also, if desired be filled with a rod of corresponding cross section, as circular rod 16 of Fig. 3 and rectangular rod 17 of Fig. 4. During the welding the bottom of the welding groove is fused so that the filler rod is integrally united to the weld metal. The use of the filler rod, aside from aiding in the prevention of the formation of cracks in the weld, strengthens the joint as it supports the metal of zone 12 above it. The voids also serve to prevent the softening of the metal of zone 12 by reason of the welding heat. When voids are employed, molten metal never penetrates to zone 12 and the only heat that gets to the metal of zone 12 must pass through the metal of zone 11. By reason of the high heat absorbing capacity of the metal of zone 11, and the rapid pass operation employed, the heat that passes to the metal of zone 12 will not be enough to have any material effect on its hardness. When the filler rods are employed the same effect is obtained. Since the filler rods at best contact, if at all, the metal of zone 12 at isolated points the heat transfer from one to the other will be very little better than when the voids alone are employed.

Figure 5:
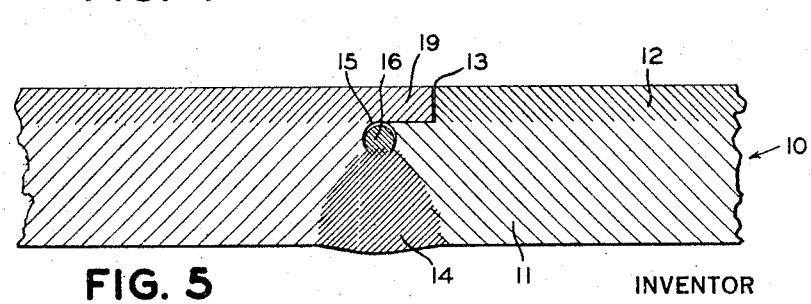

As shown in Fig. 5 gap 13 need not be positioned immediately above the middle of the weld but may be spaced a substantial distance to one side of it so that a portion 19 of the metal of zone 12 overlaps the weld. This result is accomplished by removing the metal of zone 12 for a predetermined distance from the projecting edge of one half of the welding groove and removing the metal of zone 11 for the same distance in the other edge to be joined prior to the formation of the other half of the weld groove. The overlapping of the weld may be resorted to with all of the forms of welded joints above described.

The welded article is usually stress relieved in order to put it in safe condition for use. The stress relieving treatment includes uniform heating to around 1000° F. and slow cooling to ordinary temperature. The welds may be locally stress relieved but it is preferable to stress relieve the article as a whole when this is possible.

The efficiency of a joint in armored articles such as tank bodies, shields etc. need not be very great, the efficiency of the prior art riveted joint is low and seldom exceeds 25%, as the thickness of the armor metal is not determined by the structural load but by the penetration it is to resist. The welded joint of this invention, will have a much higher efficiency than the riveted joint of the prior art.

I claim:

1. The method of welding armor metal having a hard penetration-resisting zone, whose penetration-resisting characteristics are reduced by heat, and a weldable tough backing zone integrally united thereto which comprises forming a welding groove substantially only in the backing zone of the edges to be joined, abutting the edges of the metal of the penetration-resisting zone overlying the formed welding groove and filling said groove with metal supplied by arc deposition from a fusible electrode to weld together the edges of the backing zone and to leave unconnected the edges of the penetration-resisting zone, said electrode being of small size and being traversed at a rate sufficiently high to prevent the temperature of ther metal of the penetration-resisting zone being raised to a temperature at which material softening takes place.

2. An armored article or the like made of metal plate including a hard penetration-resisting zone, whose penetration-resisting characteristics are reduced by heat, and a weldable tough backing zone integrally bonded thereto, portions of said metal plate being joined together, the edges of the penetration-resisting zone at the joint being closely spaced and unjoined for the full depth of the zone, the edges of the backing zone at the joint being united by a deposit of weld metal, a void between said penetration-resisting zone and said weld metal into which the space between said unjoined edges opens, said void having its bottom sealed by the weld metal whereby the notch effect of said space is substantially eliminated.

3. An armored article or the like made of metal plate including a hard penetration-resisting zone, whose penetration-resisting characteristics are reduced by heat, and a weldable tough backing zone integrally bonded thereto, portions of said metal plate being joined together, the edges of the penetration-resisting zone at the joint being closely spaced and unjoined for the full depth of the zone, the edges of the backing zone at the joint being united by a deposit of weld metal, a void in said backing zone into which the space between said unjoined edges communicates, and a metal member substantially filling said void, said weld metal being united to said metal member to close the bottom of said void.

ROBERT K. HOPKINS.